United States Patent
Meyer et al.

(10) Patent No.: US 10,343,745 B2
(45) Date of Patent: Jul. 9, 2019

(54) BICYCLE CRANK ARM AND CHAINRING CARRIER ASSEMBLY

(71) Applicant: SRAM, LLC, Chicago, IL (US)

(72) Inventors: James Isaac Meyer, Spearfish, SD (US); Trevor Cole Krugman, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 14/038,364

(22) Filed: Sep. 26, 2013

(65) Prior Publication Data

US 2015/0082939 A1 Mar. 26, 2015

(51) Int. Cl.
*B62M 3/00* (2006.01)
*B62M 9/10* (2006.01)

(52) U.S. Cl.
CPC .............. *B62M 3/00* (2013.01); *B62M 9/105* (2013.01); *Y10T 74/2165* (2015.01)

(58) Field of Classification Search
CPC ............. Y10T 74/2164; Y10T 74/2165; Y10T 74/2167; B62M 9/105; B62M 3/00
USPC ...... 74/594.1, 594.2; 411/271, 339; 474/144; 73/862.325
See application file for complete search history.

(56) References Cited

U.S. PATENT DOCUMENTS

| | | | | |
|---|---|---|---|---|
| 5,197,353 A | * | 3/1993 | Trenerry | B62M 3/00 280/260 |
| 5,454,676 A | * | 10/1995 | Conte | A63C 17/0006 411/339 |
| 5,586,652 A | | 12/1996 | Smilanick | |
| 5,644,953 A | * | 7/1997 | Leng | B62M 3/00 74/594.1 |
| 5,816,599 A | * | 10/1998 | Soejima | B62M 1/36 280/259 |
| 5,979,923 A | | 11/1999 | Chiang | |
| 6,158,832 A | | 12/2000 | Costa | |
| 6,276,885 B1 | | 8/2001 | Yamanaka | |
| 6,418,797 B1 | | 7/2002 | Ambrosina | |
| 6,443,865 B1 | * | 9/2002 | Yamanaka | B62J 13/00 474/144 |

(Continued)

FOREIGN PATENT DOCUMENTS

| | | | | |
|---|---|---|---|---|
| EP | 0 719 700 A2 | * | 7/1996 | B62M 1/36 |
| EP | 2853475 A1 | * | 4/2015 | B62M 3/00 |

(Continued)

OTHER PUBLICATIONS

Define may, google.com., May 3, 2016.*

(Continued)

*Primary Examiner* — Vinh Luong

(57) ABSTRACT

A bicycle crank arm and chainring carrier assembly. The assembly includes a crank arm. A chainring carrier is sized and shaped to connect to the crank arm. A first pairing feature is formed on one of the crank arm and the chainring carrier and a second pairing feature is formed on the other of the crank arm and the chainring carrier to position the chainring carrier on the crank arm. A clearance is defined between the first and second pairing features when the first and second pairing features are paired. A torque-transmitting coupling between the crank arm and the chainring carrier is configured to transmit substantially all of the torque applied to the chainring carrier from the crank arm.

19 Claims, 13 Drawing Sheets

(56) References Cited

U.S. PATENT DOCUMENTS

| | | | |
|---|---|---|---|
| 6,829,965 B1 | 12/2004 | Mombrinie | |
| 7,073,996 B1 * | 7/2006 | Hernandez | B62M 3/003 |
| | | | 411/271 |
| 7,749,117 B2 * | 7/2010 | Carrasco Vergara | B62M 9/08 |
| | | | 280/259 |
| 7,975,561 B1 | 7/2011 | Ambrosina | |
| 8,065,926 B2 * | 11/2011 | Meyer | G01L 3/1471 |
| | | | 73/862.325 |
| 8,336,400 B2 | 12/2012 | Lassanske | |
| 2009/0119032 A1 * | 5/2009 | Meyer | G01L 3/1457 |
| | | | 702/44 |
| 2014/0360314 A1 * | 12/2014 | Sams | B62M 3/003 |
| | | | 74/594.2 |
| 2015/0274253 A1 * | 10/2015 | Hara | B62M 1/36 |
| | | | 74/594.2 |
| 2018/0229793 A1 * | 8/2018 | Cody | F16H 55/30 |
| 2018/0274651 A1 * | 9/2018 | Gerhardt | F16H 55/30 |

FOREIGN PATENT DOCUMENTS

| | | |
|---|---|---|
| JP | S52 91947 U | 7/1977 |
| JP | S54 181446 U | 12/1979 |
| WO | 2013104663 A1 | 7/2013 |

OTHER PUBLICATIONS

PTO 15-104994, English translation of JP 52-91947, Shuzo Matsumoto, Sep. 1977.*
define torque—Google Search, google.com, May 27, 2017.*
Extended European Search Report from EP14003325.9 dated May 2, 2015.

* cited by examiner

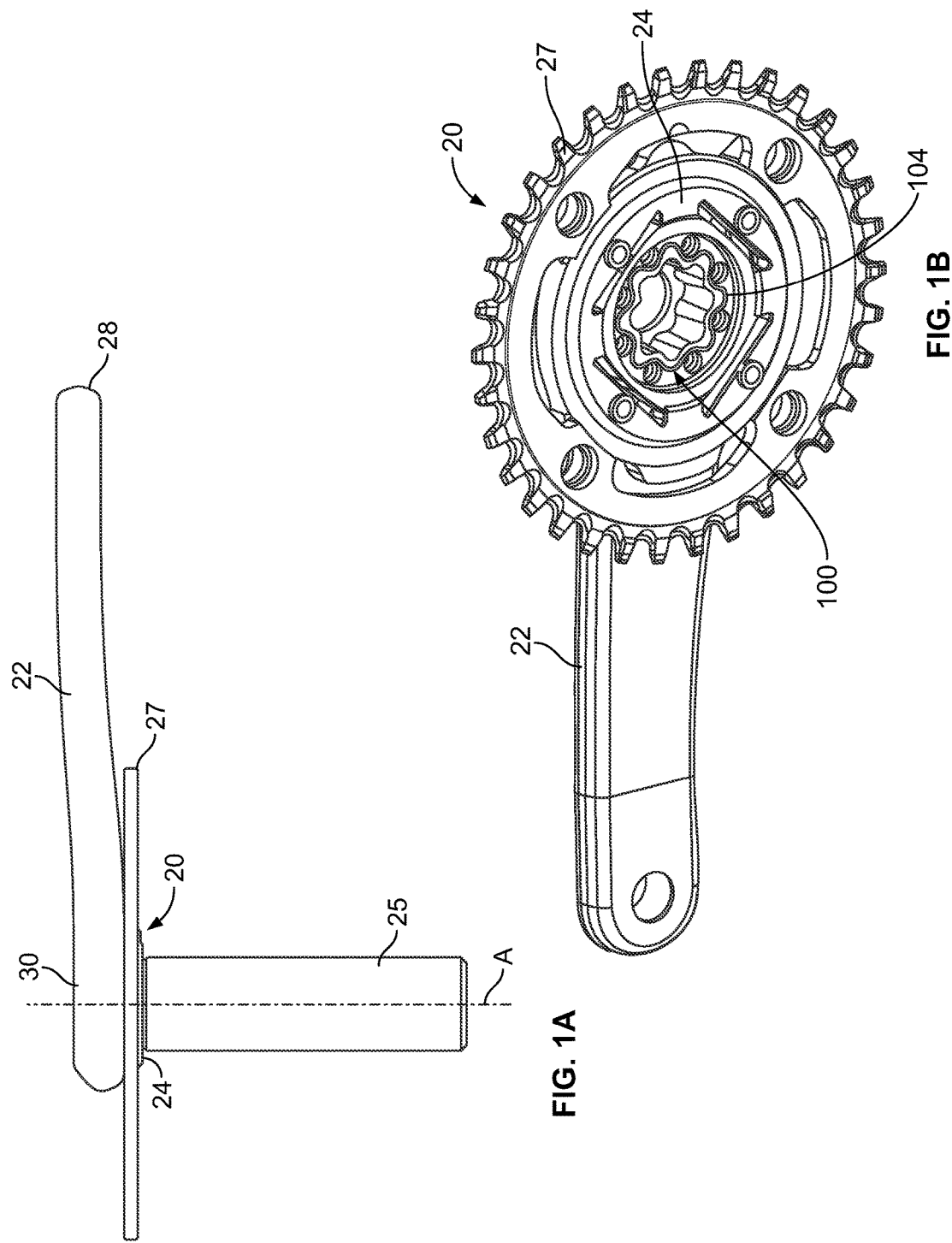

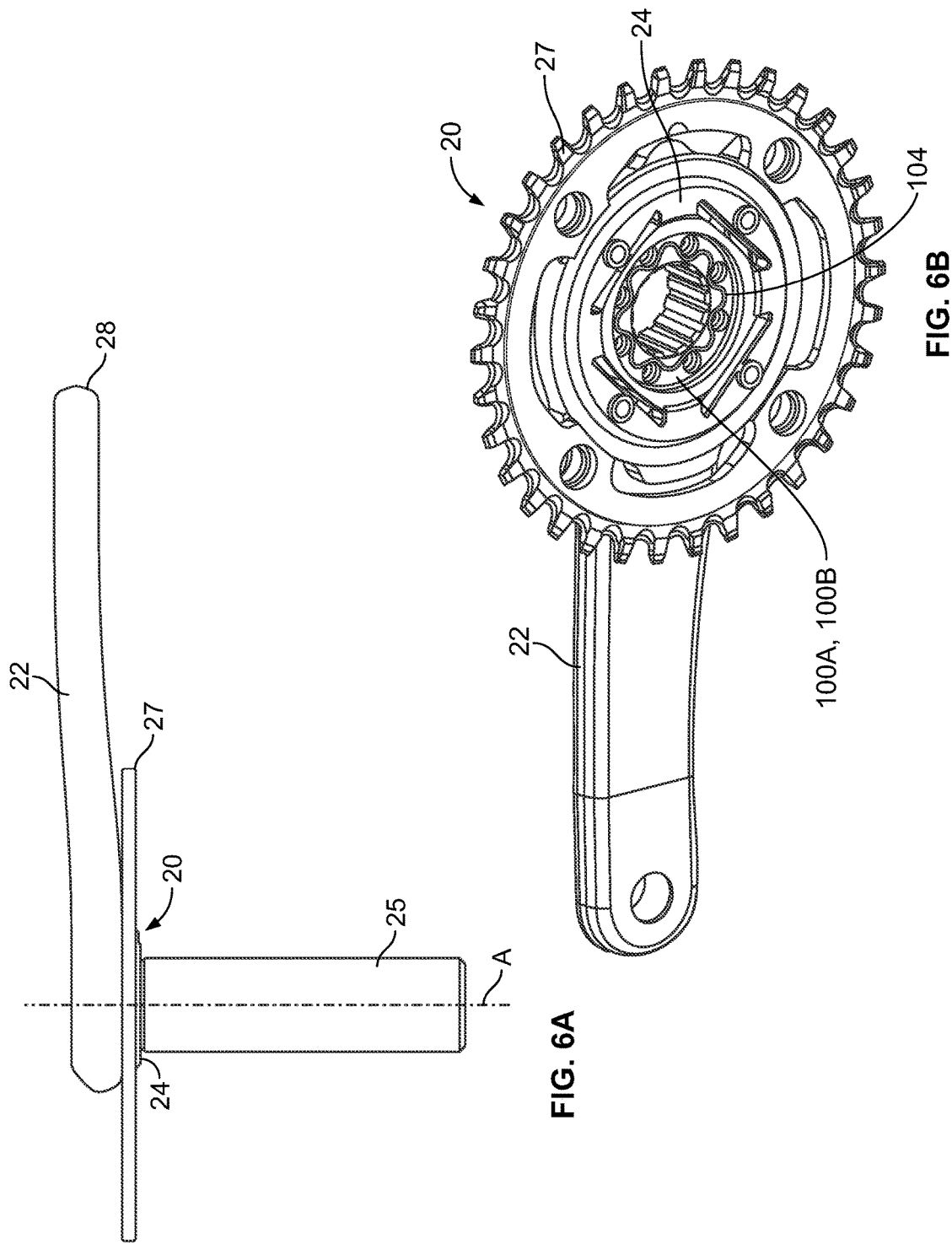

BICYCLE CRANK ARM AND CHAINRING CARRIER ASSEMBLY

BACKGROUND OF THE INVENTION

This invention relates to bicycles. In particular the invention relates to a crank arm and chainring carrier assembly.

The crankset is the component of a bicycle drivetrain that converts the pedaling motion of the rider's legs into rotational motion used to drive a chain or belt, which in turn drives a rear wheel of the bicycle. The crankset typically carries one or more chainrings or chainwheels attached to one of the two crank arms of the crankset—commonly the right-side crank arm—either directly or through a chainring carrier. The crankset is connected to the rider by pedals attached to the crank arms, to the bicycle frame by a bottom bracket and axle, and to a rear sprocket, cassette or freewheel via the chain.

The chainring or chainrings are typically attached to the right-side crank arm of the crankset and supported by a chainring carrier. In one such example, the chainring carrier may be separate from the drive-side crank arm. Other chainring carriers are integral to the drive-side crank arm. Separate, detachable chainring carriers enable a wide variety of chainring patterns to be used with the same crank arm.

A category of power meters are used on bicycles by integration into a chainring carrier, such as those designed and manufactured by Quarq®. The chainring carrier power meter includes strain gages and electronics to measure the torque applied thereto and when combined with angular velocity, power can be calculated. Chainring carrier-based power meters are typically assembled to a crank arm in the same fashion as non-power meter chainring carriers, via a press or interference fit. While connection of these chainring carriers to the crank arm is largely via the press fit of chainring carrier to crank arm via interconnected splines or the like, the connection may be supplemented by screws, although the screws do not function to any significant extent in transmitting torque from one part to another. These press fit connections convey most or all of the torque from the crank arms to the chainring carrier through the splined connection of crank arm and chainring carrier.

When attaching a chainring carrier to a crank arm the connection between the chainring carrier and crank arm should provide for quick and simple installation and result in a reliable connection. When the chainring carrier includes power meter elements, the connection should also take into consideration the transfer of torque from the crank arms to the chainring carrier such that accurate torque measurements can be made by the power meter.

There is a demand, therefore, to provide a bicycle with an effective crank arm and chainring carrier assembly. The invention satisfies the demand.

SUMMARY OF THE INVENTION

The invention provides, in one aspect, a crank arm and chainring carrier assembly. The assembly includes a crank arm. A chainring carrier is sized and shaped to connect to the crank arm. A first pairing feature is formed on one of the crank arm and the chainring carrier and a second pairing feature is formed on the other of the crank arm and the chainring carrier to position the chainring carrier on the crank arm. A clearance is defined between the first and second pairing features when the first and second pairing features are paired. A torque-transmitting coupling is formed on the crank arm and the chainring carrier configured to transmit substantially all of the torque applied to the chainring carrier from the crank arm.

Other aspects of the invention provide an assembly wherein the chainring carrier may include power meter elements. The chainring carrier may be a spider including a plurality of arms and wherein at least some of the power meter elements are disposed on the plurality of arms to sense strain. The clearance may substantially inhibit torque transfer between the first and second pairing features. The torque-transmitting coupling may provide a substantially uniform load introduction between the chainring carrier and the crank arm. The assembly may include a planar seat on the crank arm. The chainring carrier may be shaped and sized to abut the seat. The seat may include a plurality of crank arm holes formed therein. The plurality of crank arm holes may number at least eight. At least some of the plurality of crank arm holes may be substantially centered on a bore circle diameter. The plurality of crank arm holes may be substantially centered on the bore circle diameter. The plurality of crank arm holes may be distributed substantially evenly about the bore circle diameter. The chainring carrier may include a plurality of chainring carrier holes, at least two of the chainring carrier holes including an angled section; and a plurality of fasteners, at least two of the plurality of fasteners having an alignment feature formed thereon to cooperate with the corresponding angled section of the chainring carrier holes to align and connect the chainring carrier on the crank arm to form the torque-transmitting coupling and to maintain the clearance between the first and second pairing features. The angled section may be formed about midway along each of the plurality of carrier holes. The fasteners may include a head portion and a threaded portion formed on opposite sides of the alignment feature. A least two of the carrier holes includes a straight-sided first section and a straight-sided second section flanking the angled section, the first section being wider than the second section. The alignment features and the angled sections may both be tapered and wherein each forms an angle of about 90 degrees. The clearance may substantially avoid a redundant load transfer between the carrier and the crank arm through the first and second pairing features. The first pairing feature may be a portion of the interface. The first pairing feature may include a post portion formed radially inward of the seat. The interface may include a socket sized and shaped to receive a spindle. The socket may at least be in part defined by an interior profile of the post. The post portion may extend axially from the crank arm. The second pairing feature may include interior profile formed on the chainring carrier. The post portion may include an exterior profile. The interior profile of the chainring carrier may be sized and shaped to be arranged in a predetermined rotational position on the exterior profile of the post portion and the clearance may be defined therebetween when the chainring carrier is paired to the crank arm. The exterior profile may be substantially parallel to the interior chainring carrier profile. The exterior profile may include lobes. A majority of the lobes may extend radially to or past a bore circle diameter. The exterior profile of the post may include a key that positions the chainring carrier on the crank arm in the predetermined rotational position. The key may be a protrusion of the post that extends radially short of the bore circle diameter. The chainring carrier may be configured to attach to two or more chainrings.

Another aspect of the invention provides a crank arm and chainring carrier assembly, including a crank arm having a plurality of crank arm holes formed therein. A chainring carrier has a plurality of carrier holes formed therein. At least two of the plurality of carrier holes is formed with an angled section. A first pairing feature is formed on one of the crank arm and the chainring carrier and a second pairing feature is formed on the other of the crank arm and the chainring carrier to position the chainring carrier on the crank arm. A clearance is defined between the first and second pairing features when the first and second pairing features are paired. A plurality of fasteners is provided and at least two of the plurality of fasteners has an alignment feature formed thereon to cooperate with the corresponding angled section of the chainring carrier holes to align and connect the chainring carrier on the crank arm to form a torque-transmitting coupling of the crank arm and the chainring carrier and to maintain the clearance between the first and second pairing features.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 1A is a top view of a chainring carrier and crank arm assembly according to a first embodiment of the invention attached to a spindle and having a chainring mounted on the chainring carrier;

FIG. 1B is a perspective view of the chainring carrier and crank arm assembly of FIG. 1A with the spindle omitted;

FIG. 6A is a top view of a chainring carrier and crank arm assembly connected to a spindle and chainring according to a second embodiment of the invention;

FIG. 6B is a perspective view of the chainring carrier and crank arm assembly of FIG. 6A with the spindle omitted;

DETAILED DESCRIPTION OF THE PREFERRED EMBODIMENTS

Figure 1C:
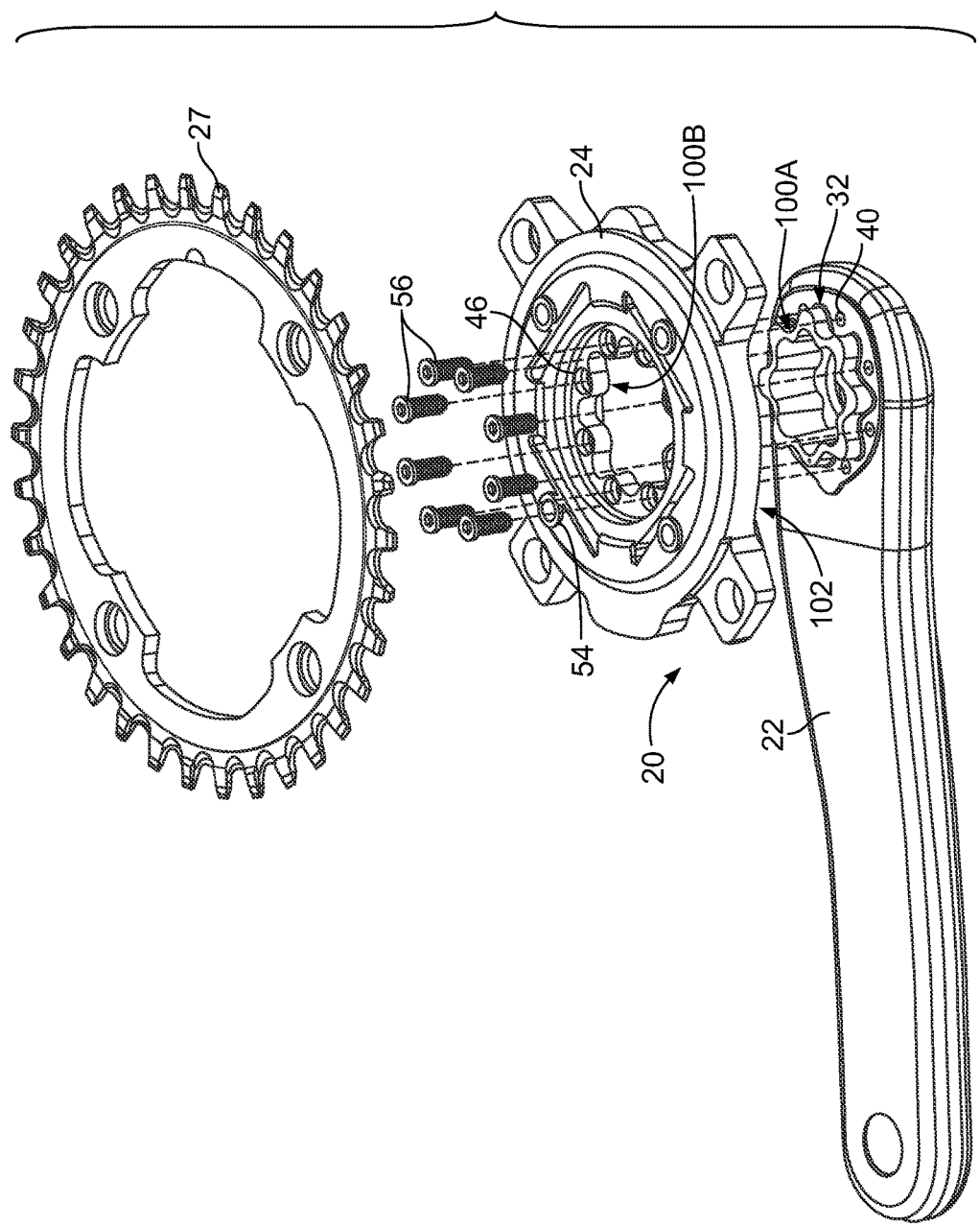
FIG. 1C is an exploded view of the assembly of FIG. 1B with fasteners.

Referring to FIGS. 1-15, a crank arm and chainring carrier assembly 20 includes an elongated crank arm 22 and chainring carrier 24 according to one embodiment of the invention. The chainring carrier 24 and crank arm 22 are separately formed. The chainring carrier 24 is sized and shaped to be fixed to the crank arm 22 by a plurality of fasteners 56 (FIGS. 14, 15) as will be discussed in detail below. It will be understood that the chainring carrier 24 may be configured to carry a separate chainring 27, or two or more chainrings, by way of tabs 26, flanges, openings or other known structures that are positioned at or near the outer periphery of the chainring carrier. One embodiment of the chainring carrier 24 is referred to as a spider.

The elongated crank arm 22 has a distal end portion 28 with a threaded hole 29 that is shaped and sized for receiving a pedal (not shown) as is well known in the art. The crank arm 22 has a proximal end portion 30 that connects to the chainring carrier 24. The proximal end portion 30 may include an insert 32, which is used in composite crank arms. The proximal end portion 30 may also be a portion of the crank arm 22 formed as a one-piece or multiple piece crank arm made of metal, for example.

The crank arm 22 has a planar seat or shoulder 33 formed on the crank arm or fixedly connected to the proximal portion 30 of the crank arm against which the chainring carrier 24 abuts and is kept flush against when the chainring carrier is mounted to the crank arm in a location fit, i.e., wherein mechanical sizes of mating parts are such that, when assembled, the parts are positioned, as desired, in relation to each other.

The crank arm 22 may have a socket 34 that is configured to receive a bottom bracket spindle or axle 25 in a well-known manner, for example, via an interference fit. The crank arm 22 includes a first pairing feature 100A. The first pairing feature 100A may be included on a post portion 35 of the crank arm 22, the post portion extending axially A from the seat 33.

Figure 1D:
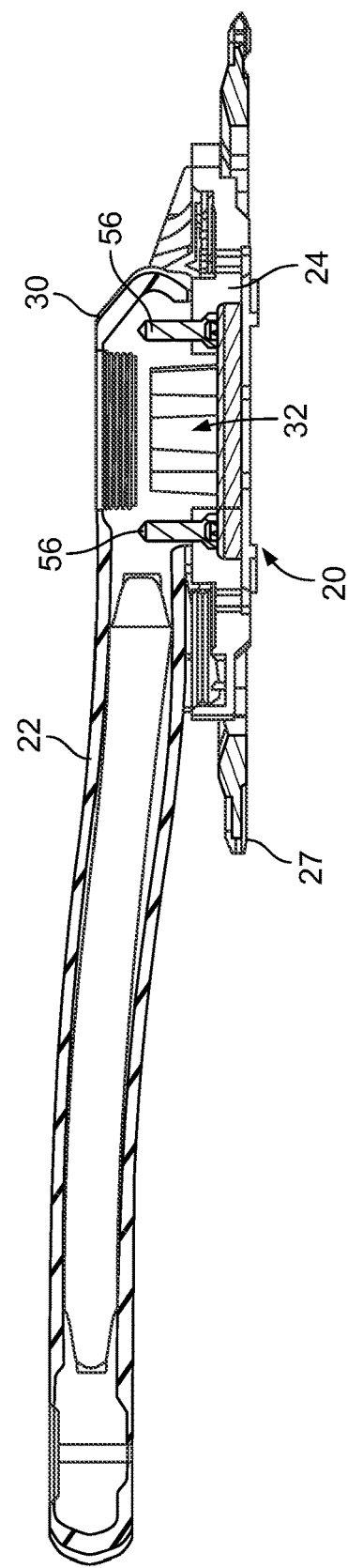
FIG. 1D is a cross sectional view of the assembly of FIG. 1C with fasteners.
Figure 2:
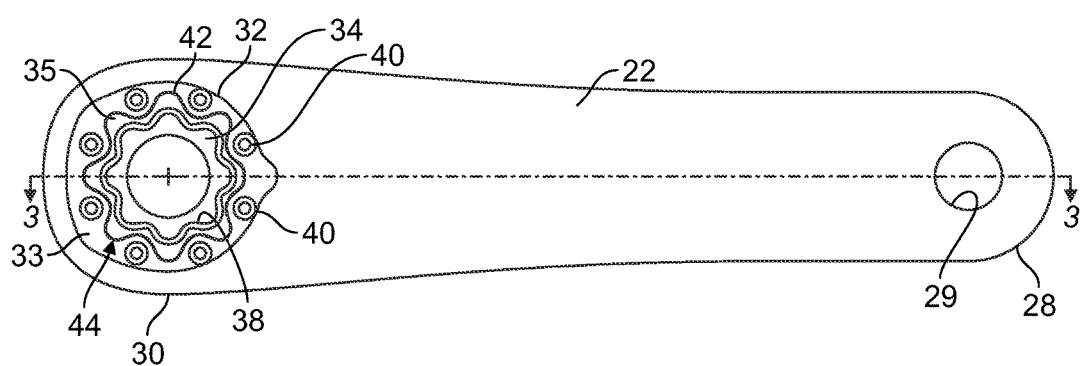
FIG. 2 is a side view of a crank arm, specifically the side that faces the bicycle.
Figure 3:
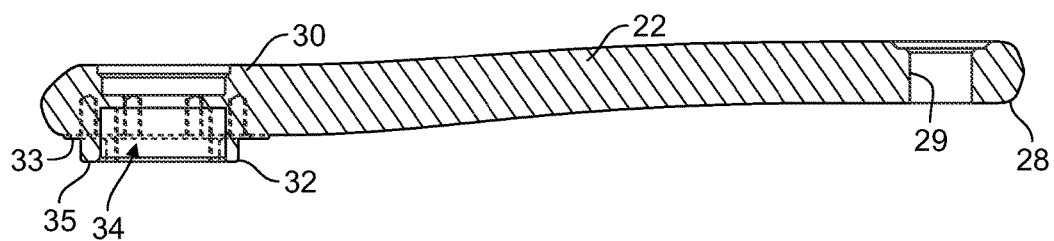
FIG. 3 is a cross sectional view of line 3-3 of FIG. 2.
Figure 4:
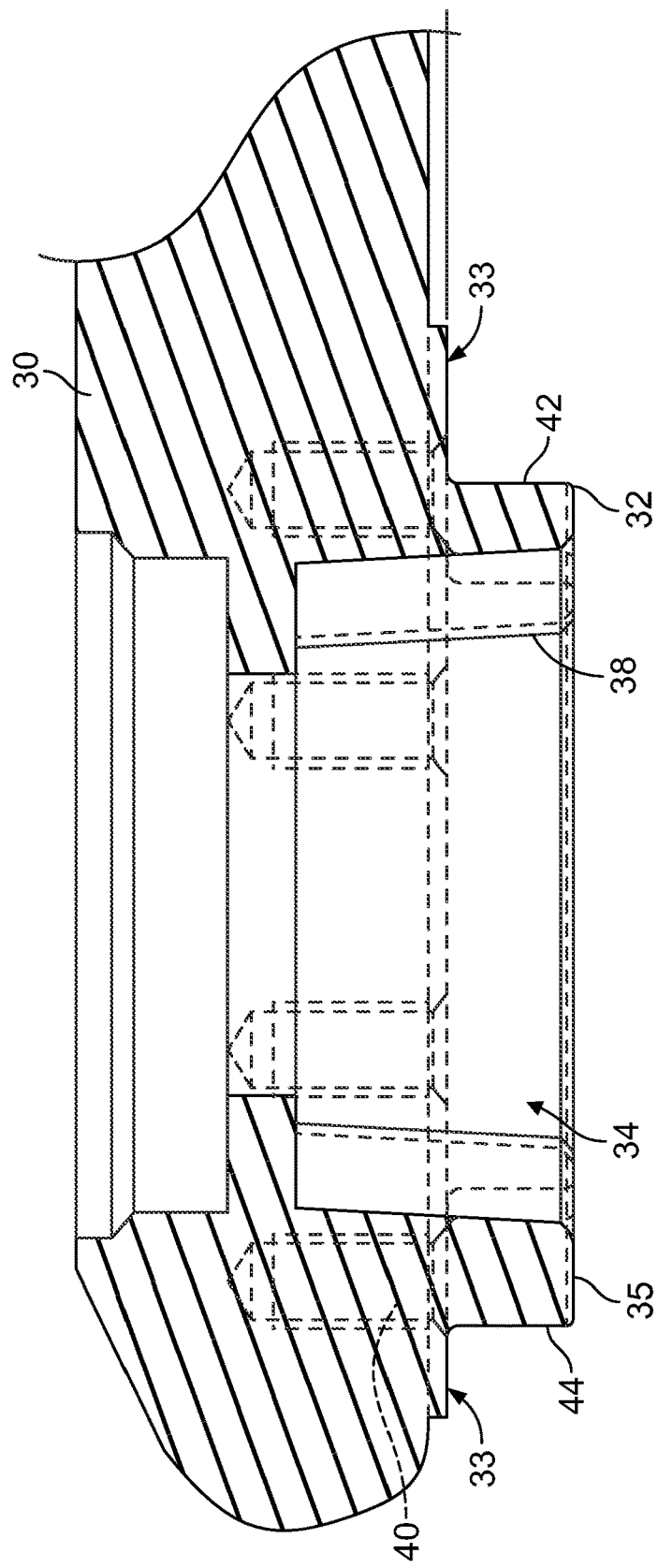
FIG. 4 is an enlarged cross sectional view of FIG. 3.
Figure 5:
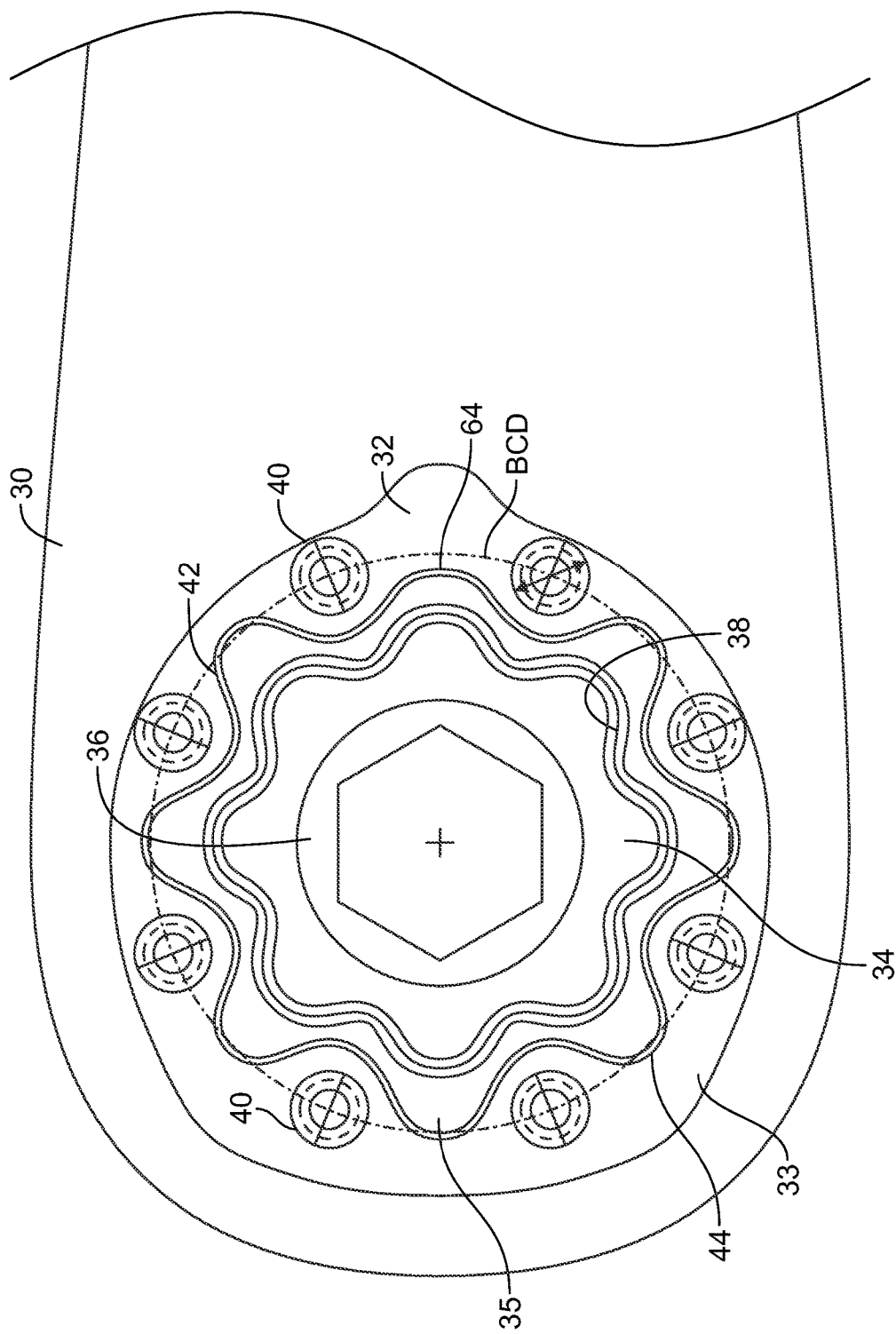
FIG. 5 is an enlarged side view of FIG. 2.
Figure 6C:
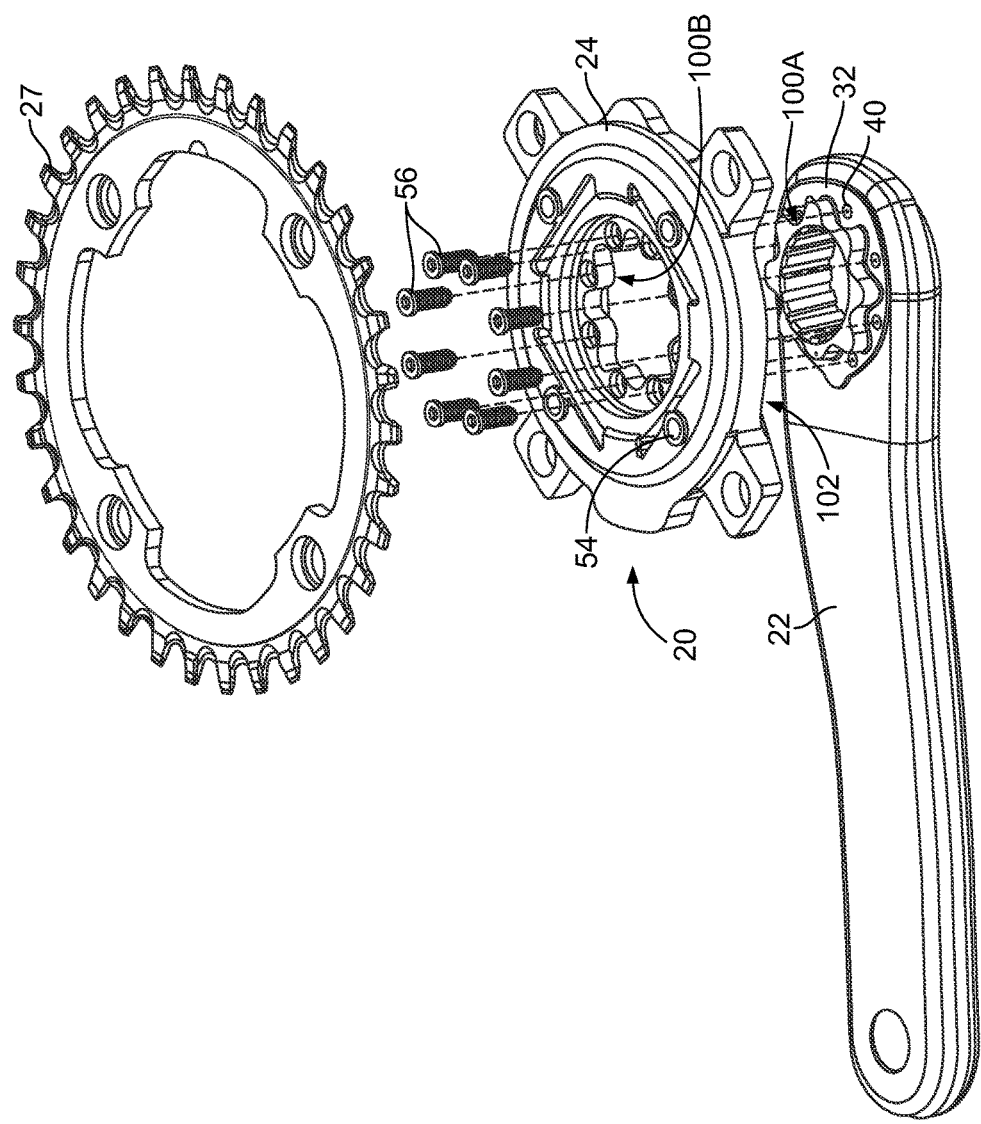
FIG. 6C is an exploded view of the assembly of FIG. 6B with fasteners.
Figure 7:
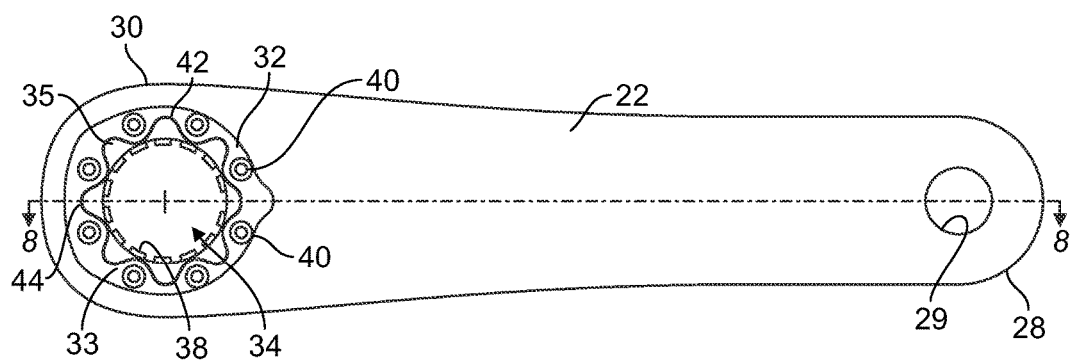
FIG. 7 is a side view of the crank arm of FIG. 6A.
Figure 8:
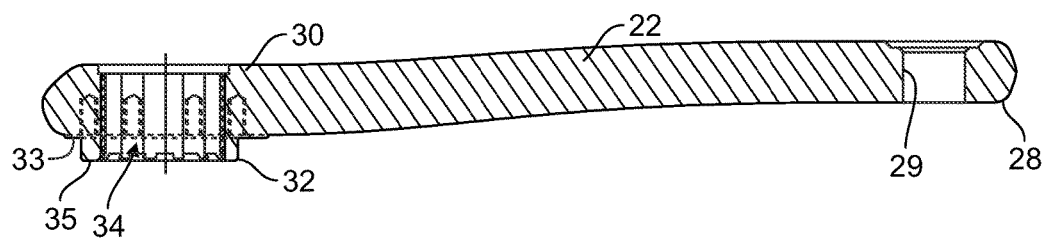
FIG. 8 is a cross sectional view of line 8-8 of FIG. 7.
Figure 9:
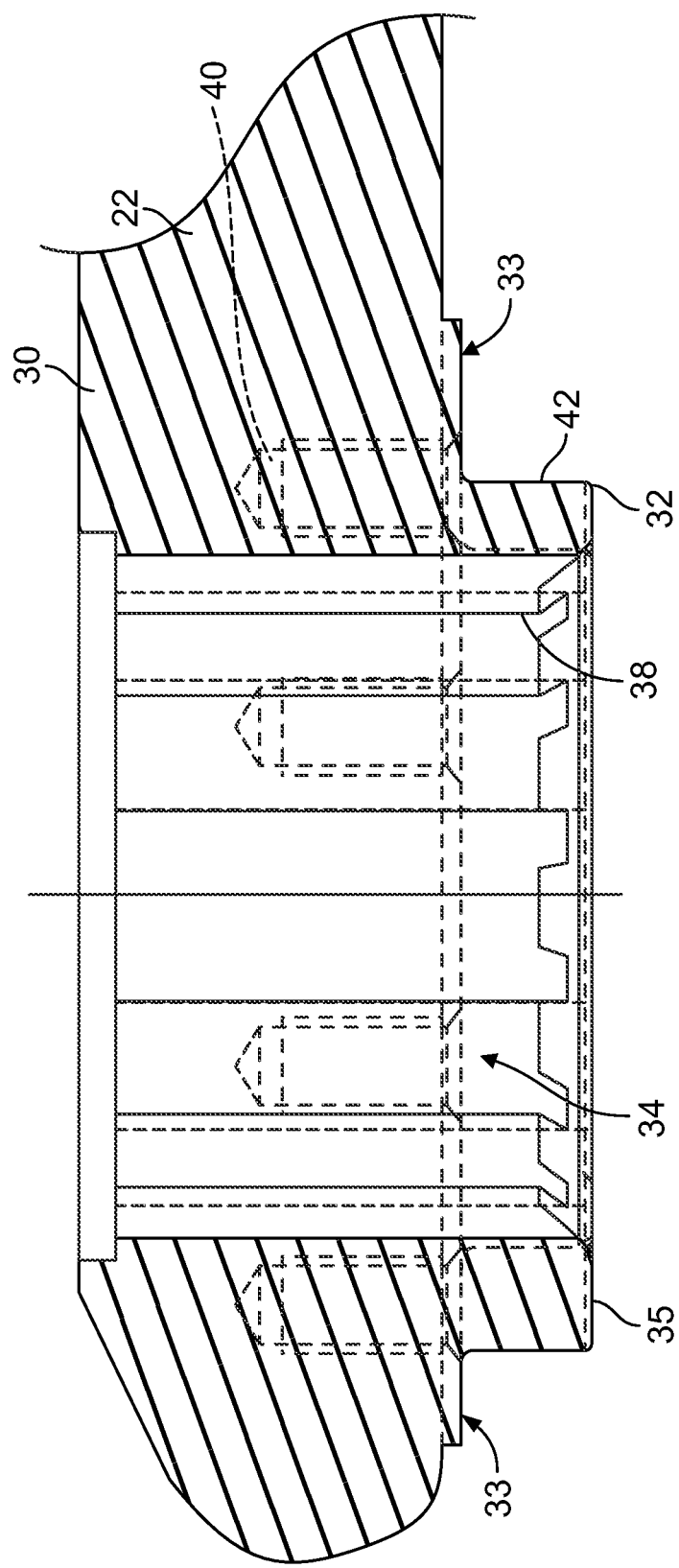
FIG. 9 is an enlarged cross sectional view of FIG. 8.
Figure 10:
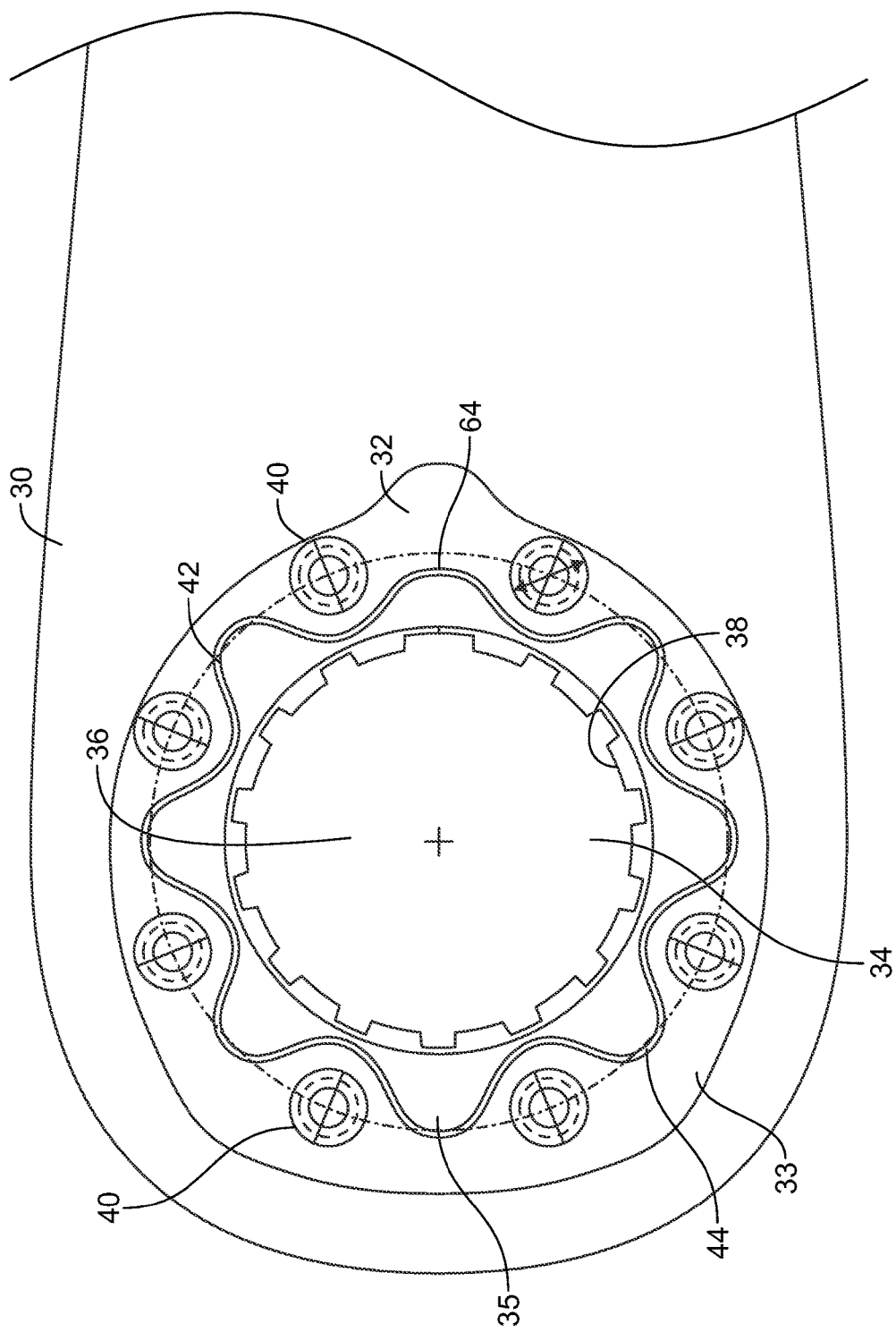
FIG. 10 is an enlarged side view of FIG. 7.

In one example, the socket 34 is configured to receive a tapered eight-lobe spline as provided on a commercially available BB30-type bottom bracket spindle 25 (FIG. 1). The spindle 25 fits within the socket 34 in a press or interference fit. In another example, the spindle 25 may include rectangular section splines, as provided on a commercially available GXP® bottom bracket spindle (FIG. 6). It will be understood that the socket 34 may be shaped and sized to receive any of a number of spindle or axle configurations. The crank arm 22 may include a crank arm bolt 36 to fasten the crank arm to a spindle 25 as is well known. The socket 34 may be considered to be defined, at least in part, by the interior profile 38 of the post portion 35 and the crank arm bolt 36, if present. The interior profile 38 and socket 34 are shaped and sized to be connected to a spindle/axle part 25.

The seat 33 includes a plurality of threaded crank arm holes 40, formed therein, for receiving fasteners. Some of all of the crank arm holes 40 may be formed about and/or spaced evenly along a predetermined bolt or bore circle diameter "BCD" about the post portion 35 or not along the BCD The radially exterior wall of the post portion 35 defines an exterior profile 42. The exterior profile 42 of the post portion 35 may be configured to roughly parallel the interior profile 38 or it may be configured as a different profile. The exterior profile 42 is one embodiment of the first pairing feature 100A.

In one example, the exterior profile 42 includes a plurality of lobes 44 that extend radially and between the crank arm holes 40. At least some of the lobes 44 extend outwardly to a radial distance near or past the bore circle diameter BCD.

Some of the lobes 44 may extend radially a distance less than the bore circle diameter BCD. The lobes may be rounded or tooth shaped or other suitable shapes. One or more of the lobes 44 may have a different shape and/or size than the other lobes to function as a key 64 with a corresponding negative feature on the chainring carrier 24 such that the chainring carrier is oriented in a desired predetermined manner on the crank arm 22.

Figure 11:
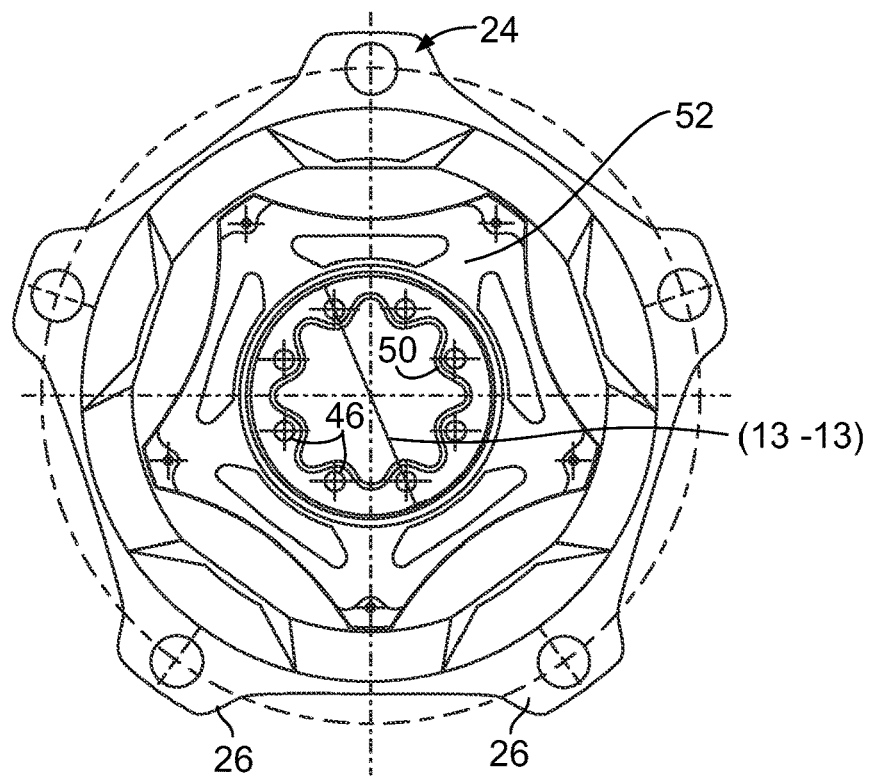
FIG. 11 is a first side view of a chainring carrier according to the invention.
Figure 12:
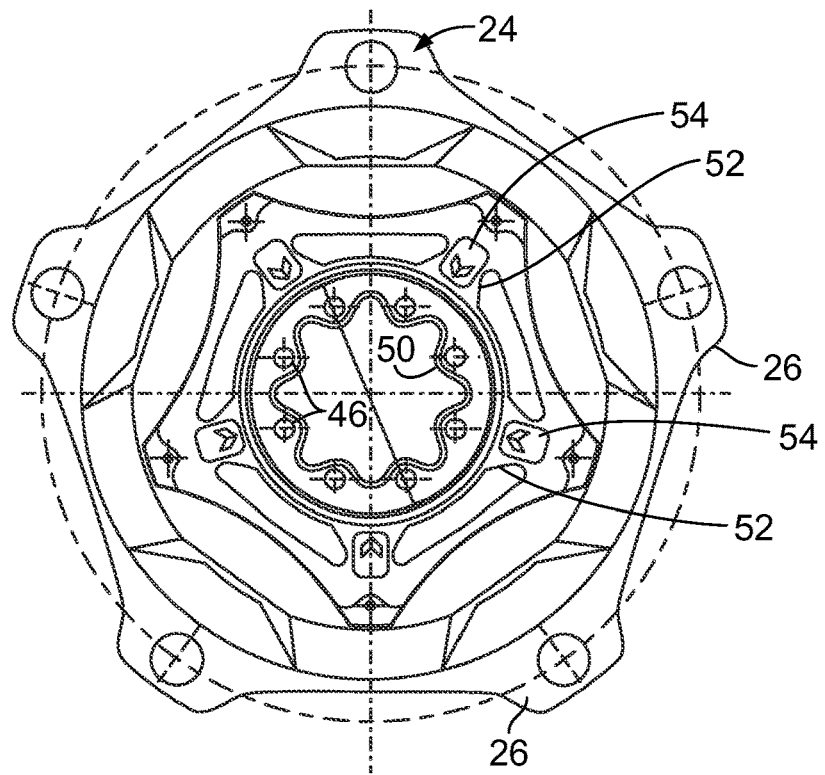
FIG. 12 is a second side view of the chainring carrier of FIG. 11.
Figure 13:
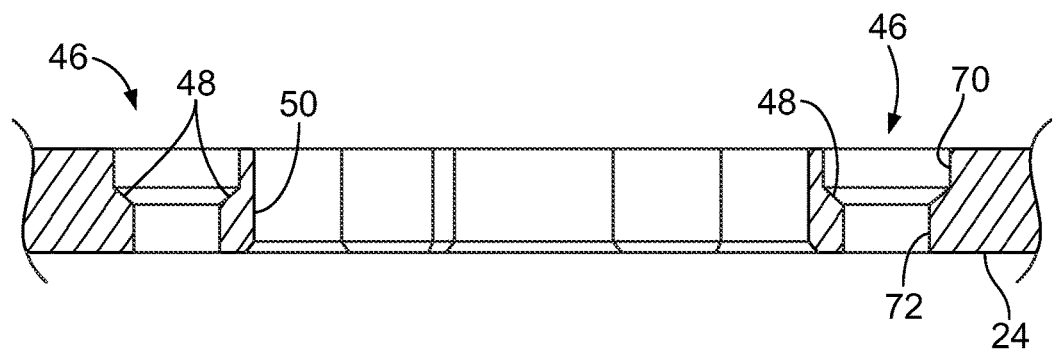
FIG. 13 is an enlarged cross sectional view of the chainring carrier according to the invention through line 13-13 of FIG. 11.

Referring to FIGS. 11-13, the chainring carrier 24 includes a plurality of carrier holes 46, some or all of which are formed in the same bore circle diameter BCD as the interface 32 and in position to align with the crank arm holes 40 of the interface. The carrier holes 46 may be non-threaded. In one example, there are eight carrier holes 46 and eight crank arm holes 40, but other numbers of holes are contemplated. Some or all of the carrier holes 46 may have an angled section 48, formed in the chainring carrier, at or about a midsection of each hole, the purpose of which will be described below.

The chainring carrier 24 includes a second pairing feature 100B. The second pairing feature 100B is defined by an interior chainring carrier profile 50 that may be generally parallel to the exterior profile 42 of the post 35 to provide a location fit with the first pairing feature 100B. The interior chainring carrier profile 50 may be sized and shaped to provide a clearance 104 between the interior chainring carrier profile and the exterior profile 42. The clearance 104 may be about 0.3 millimeters. Under normal riding conditions, the clearance 104 is maintained by the assembly 20. In other words, torque is not transferred through the first and second pairing features 100A, B, i.e., directly from the exterior profile 42 to the carrier profile 50, when typical forces of the magnitude generated by pedaling and riding are applied to the crank arm 22, because the clearance is maintained therebetween. For purposes of the present invention, the cooperative combination of the interior chainring carrier profile 50 and the exterior profile 42 of the post 35 may be considered first and second pairing features 100A, B.

The chainring carrier 24 may be constructed to provide for power meter elements. For example, the chainring carrier 24 may be provided with a plurality of arms 52 and strain gages 54 may be arranged on the arms or like features, as known in the art. It will be understood that the strain gages 54 are connected to circuitry (not shown) to generate power information, which may be transmitted to a suitable head unit/readout (not shown), as is known in the art.

As shown in FIG. 13, at least some of the carrier holes 46 have a wide section 70, which transitions at the angled section 48 through the chainring carrier 24 to a narrower section 72. The carrier holes 46 are shaped and sized to receive fasteners 56 and cooperate therewith to mount the chainring carrier 24 to the crank arm 22.

Figure 14:
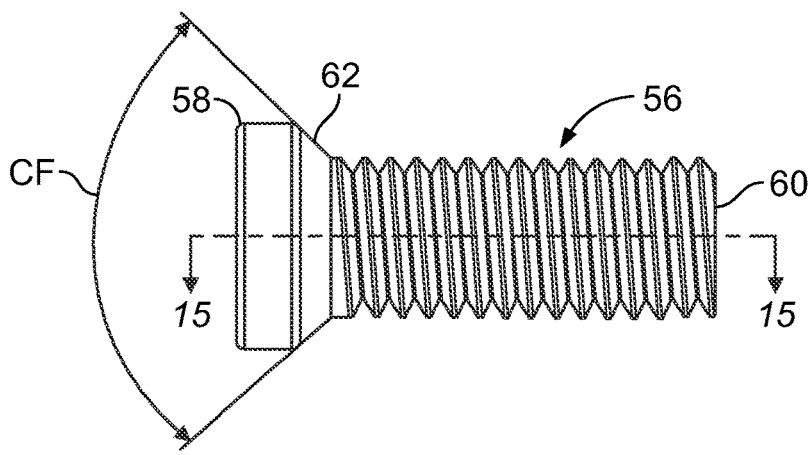
FIG. 14 is a side view of a fastener to connect and align the chainring carrier on the crank arm according to the invention.
Figure 15:
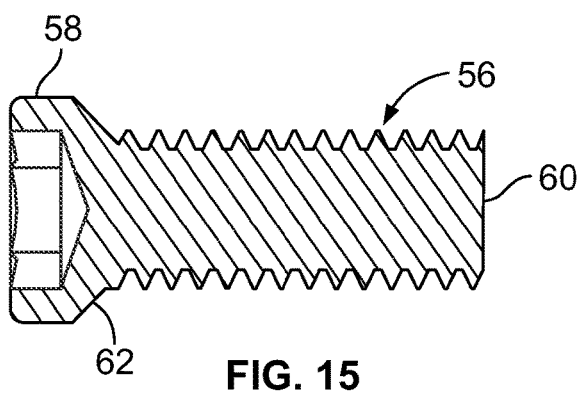
FIG. 15 is a cross sectional view of the fastener of FIG. 14 through lines 15-15 of FIG. 14.

Turning to FIGS. 14 and 15, the assembly 20 is assembled with the fasteners 56, which may be, for example, bolts, centering bolts or centering screws. The fasteners 56 may have a head 58 with a tool-engaging socket or tool-engaging feature at one end and a threaded end 60 opposite the head. The head 58 generally fits into the wide section 70. The threaded end 60 fits within the narrower section 72 (FIG. 13). Between the head 58 and threaded end 60 is a centering or alignment feature 62 that has an angled, cone or conical shape or section to fit to and/or cooperate with the angled midsection 48 of the crank arm holes 40. The angled midsection is tapered and may be configured to be about 90 degrees as shown by CF (FIG. 14). Insertion and tightening of the fasteners 56 in the carrier holes 46 of the chainring carrier 24 and into the crank arm holes 40 of the seat 33 causes the carrier holes to become aligned with the crank arm holes and causes the chainring carrier to be aligned and fastened in place on the interface 32. The action of the alignment feature 62 of the fasteners 56 on the angled section 48 of the crank arm holes 40 cause proper alignment of the chainring carrier on the crank arm. It also has an objective of maintaining the clearance 104, at least to produce an initial alignment state of the chainring carrier 24 on the crank arm 22. In other words, the chainring carrier 24 is aligned by the fasteners 56 on the crank arm 22 without "clocking," i.e., an "out of phase" position of the chainring carrier on the interface 32.

It is believed that if the chainring carrier 24 shifts on the crank arm 22 resulting in contact between the exterior profile 42 of the interface 32 and the interior chainring carrier profile 50, a condition known as "clocking", that an offset shift in power meter response can result. It is believed that clocking can result in less accurate power measurement in the chainring carrier. If the carrier 24 is not a power meter, the avoidance of clocking may not be as important. Thus, it is believed that it is advantageous that all of the torque from the crank arm 22 to the chainring carrier 24 is transmitted solely through a torque-transmitting coupling 102, i.e., the mounting of the chainring carrier 24 on the crank arm 22 by the fasteners 56, and no torque is transmitted from the first and second pairing features 100A, B, e.g., the exterior profile 42 to the interior chainring carrier profile 50. A further advantage of the crank arm assembly 20 according to the invention is that dimensional tolerances between the chainring carrier 24 and crank arm 22 need not be as tight as an assembly that is designed for an interference fit or a slip fit.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A crank arm and chainring carrier assembly, comprising:
   a crank arm having a plurality of crank arm holes formed therein;
   a chainring carrier having a plurality of carrier holes formed therein, at least two of the plurality of carrier holes formed with an angled section;
   a first pairing feature including a first wall forming an exterior profile formed on the crank arm and a second pairing feature including a second wall forming an interior profile formed on the chainring carrier to position the chainring carrier on the crank arm;
   a clearance defined between the first wall and second wall when the first and second pairing features are paired, the clearance substantially inhibiting torque transfer between the first and second pairing features; and
   a plurality of fasteners, at least two of the plurality of fasteners having an alignment feature formed thereon to cooperate with the corresponding angled section of the chainring carrier holes to align and connect the chainring carrier on the crank arm to form a torque-transmitting coupling of the crank arm and the chainring carrier and to maintain the clearance between the first and second pairing features.

2. The assembly of claim 1, wherein the chainring carrier includes power meter elements.

3. The assembly of claim 2, wherein the chainring carrier is a spider including a plurality of arms and wherein at least some of the power meter elements are disposed on the plurality of arms to sense strain.

4. The assembly of claim 1, wherein the torque-transmitting coupling provides a substantially uniform load transfer between the chainring carrier and the crank arm.

5. The assembly of claim 1, further comprising a planar seat on the crank arm.

6. The assembly of claim 5, wherein the chainring carrier is shaped and sized to abut the seat.

7. The assembly of claim 1, wherein the plurality of crank arm holes numbers at least eight.

8. The assembly of claim 1, wherein at least some of the plurality of crank arm holes are substantially centered on a bore circle diameter.

9. The assembly of claim 8, wherein all of the plurality of crank arm holes are substantially centered on the bore circle diameter.

10. The assembly of claim 8, wherein the plurality of crank arm holes are distributed substantially evenly about the bore circle diameter.

11. The assembly of claim 1, wherein the angled section is formed about midway along two or more of the plurality of carrier holes.

12. The assembly of claim 11, wherein at least two of the fasteners include a head portion and a threaded portion that are formed on opposite sides of the alignment feature.

13. The assembly of claim 12, wherein at least two of the carrier holes includes a straight-sided first section and a straight-sided second section flanking the angled section, the first section being wider than the second section.

14. The assembly of claim 1, wherein the alignment features and the angled sections are both tapered and wherein each forms an angle of 90 degrees.

15. The assembly of claim 1, wherein the clearance substantially avoids a redundant load transfer between the carrier and the crank arm through the first and second pairing features.

16. The assembly of claim 1, wherein the first pairing feature includes a post portion formed radially inward of the seat.

17. The assembly of claim 16, wherein the crank arm includes a socket sized and shaped to receive a spindle.

18. The assembly of claim 17, wherein the socket is at least in part defined by an interior profile of the post.

19. The assembly of claim 16, wherein the post portion extends axially from the crank arm.

* * * * *